UNITED STATES PATENT OFFICE.

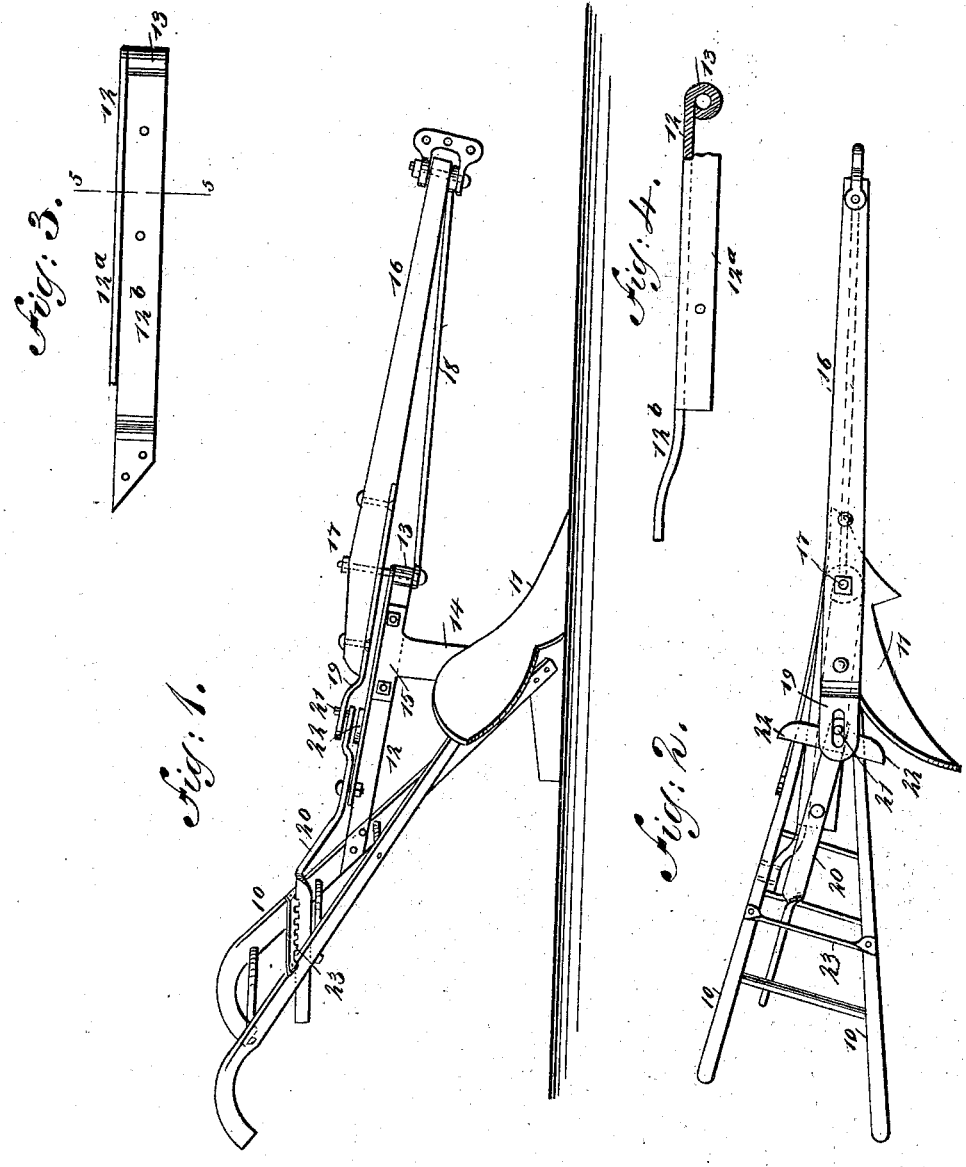

FREDERICK SIDNEY MOORE, OF HANFORD, CALIFORNIA.

PLOW.

SPECIFICATION forming part of Letters Patent No. 513,335, dated January 23, 1894.

Application filed June 27, 1893. Serial No. 478,954. (No model.)

*To all whom it may concern:*

Be it known that I, FREDERICK SIDNEY MOORE, of Hanford, in the county of Tulare and State of California, have invented a new and Improved Plow, of which the following is a full, clear, and exact description.

My invention relates to an improvement in plows, and it has for its object to provide a means whereby a shifting device of the character shown and described in the patent granted to myself December 6, 1892, No. 487,578, may be conveniently and effectively applied to a single plow, in such manner that the plow beam may be shifted laterally either to the right or to the left at the handle end of the plow.

The invention consists in the novel construction and combination of the several parts, as will be hereinafter fully set forth and pointed out in the claims.

Reference is to be had to the accompanying drawings forming a part of this specification, in which similar figures of reference indicate corresponding parts in all the views.

Figure 1 is a side elevation of a single plow having the invention applied thereto. Fig. 2 is a plan view thereof. Fig. 3 is a side elevation of the body plate of the machine. Fig. 4 is a plan view of said plate partially in section; and Fig. 5 is a vertical section taken practically on the line 5—5 of Fig. 3.

In carrying out the invention the handles 10, are secured at their lower ends preferably to the under rear surface of the plow share 11, and a body plate 12, is secured at one end to one of the handles, which body plate extends forwardly over the land side of the plow, occupying essentially a horizontal position. The body plate 12, is angular in cross section, as shown in Fig. 5, comprising an upper horizontal member $12^a$ and a lower vertical member $12^b$. The vertical member is preferably longer than the horizontal one, and the forward end of the vertical member is bent upon itself beneath the corresponding portion of the upper or horizontal member to form an eye 13, as shown best in Figs. 3 and 4. The rear end of the body plate is secured to the handle by bolts, rivets, or equivalent fastening devices, and preferably the plow shank 14, is provided with substantially a T-head 15, which head is carried to an engagement with the inner surface of the vertical member of the body plate, and is bolted or otherwise secured thereto, as shown in Fig. 1.

The plow beam 16, is pivoted upon the body plate 12, the pivot pin 17 being passed through the beam near its heel or rear end, and likewise through the eye 13 in the body plate. The pivot bolt 17, after passing through the eye 13, is likewise passed through the rear end of a truss rod 18, the forward end of which rod is attached in any approved manner to the clevis end of the beam. It will be understood that the connection between the truss rod and the plow beam and body plate is a pivotal one, so that the plow beam may be shifted to the right or to the left upon its pivot 17 without interference by the truss rod, and the rod at the same time serves to strengthen and stay the beam.

A link 19, or the equivalent thereof, is secured upon the under surface of the heel of the plow beam, the link being made to extend rearwardly beyond the heel; and the plow beam is adjusted laterally through the medium of a lever 20, which lever is preferably fulcrumed upon the rear portion of the horizontal member of the body plate, as shown in both Figs. 1 and 2; and the forward end of the lever carries a pin 21, which passes up through a slot in the rearwardly-projecting portion of the link 19. In order that the forward end of the lever 20 may be supported when it is carried from over the body plate either to the right or to the left, ears 22, are projected from the body plate at each side immediately below the forward end of the lever and in the path of its upward movement. The lever is adapted to engage at its handle end with a rack 23, which rack is ordinarily attached to both of the handles, and serves as a stay therefor; and when the lever is to be manipulated it is pressed downward out of engagement with the rack and then moved sidewise, whereupon the clevis end of the beam will be carried in the same direction as the handle end of the lever, and when the beam has been properly adjusted the lever is released, and it will automatically engage with the nearest notch in the rack. Thus it will be observed that the line of draft may be instantly changed, and the plow share made to travel closer to or farther from whatever plants may be under cultivation. It is also evident that the attachment is exceedingly simple and economic, and that it may be applied to the beam of any single plow.

Having thus described my invention, I claim as new and desire to secure by Letters Patent—

1. The combination with a plow shank, and the plow handles, of a body plate angular in cross section and provided with an eye at its forward end, said plate being secured to the plow shank and to one of the handles, a beam pivoted to the forward end of the body plate, and provided with a slotted link projecting from its rear end, a lever pivoted to the body plate and provided with a pin at one end working in the slot of the said link, and means for locking the lever in position, substantially as described.

2. The combination with a plow shank, and the plow handles, of an apertured body plate angular in cross section and provided with lateral ears and with a socket at its forward end, said plate being secured to the plow shank and to one of the handles, a beam pivoted to the forward end of the body plate and provided with a slotted link projecting from its rear end, a lever pivoted to the body plate and provided with a pin projecting into the slot of the link, and a rack carried by the handles with which the lever engages for locking the said lever in position, substantially as herein shown and described.

FREDERICK SIDNEY MOORE.

Witnesses:
FELIX MOORE,
JUDD SMITH.